(12) United States Patent
Jochman (10) Patent No.: US 11,993,155 B2
(45) Date of Patent: May 28, 2024

(54) AUXILIARY POWER UNIT AIR CONDITIONING FOR TRUCK CAB COOLING

(71) Applicant: Illinois Tool Works Inc., Glenview, IL (US)

(72) Inventor: Nathan Joe Jochman, Menasha, WI (US)

(73) Assignee: Illinois Tool Works Inc., Glenview, IL (US)

(*) Notice: Subject to any disclaimer, the term of this patent is extended or adjusted under 35 U.S.C. 154(b) by 113 days.

(21) Appl. No.: 16/880,570

(22) Filed: May 21, 2020

(65) Prior Publication Data

US 2020/0376964 A1  Dec. 3, 2020

Related U.S. Application Data

(60) Provisional application No. 62/854,043, filed on May 29, 2019.

(51) Int. Cl.
*B60L 1/12* (2006.01)
*B60H 1/00* (2006.01)
*B60L 1/00* (2006.01)

(52) U.S. Cl.
CPC ............ *B60L 1/12* (2013.01); *B60H 1/00428* (2013.01); *B60H 1/00657* (2013.01); *B60L 1/003* (2013.01)

(58) Field of Classification Search
None
See application file for complete search history.

(56) References Cited

U.S. PATENT DOCUMENTS

| | | | |
|---|---|---|---|
| 10,081,226 B2 | 9/2018 | Connell | |
| 2012/0085830 A1* | 4/2012 | Sundhar | B60H 1/00428 236/49.3 |
| 2012/0318914 A1* | 12/2012 | Rajashekara | B64D 41/00 244/58 |
| 2016/0229362 A1* | 8/2016 | Brutus | H02K 7/1815 |
| 2018/0086181 A1* | 3/2018 | Connell | B60H 1/00657 |
| 2018/0281556 A1* | 10/2018 | Koberstein | B60L 58/26 |
| 2020/0231041 A1* | 7/2020 | Lavrich | B60H 1/3211 |
| 2020/0324616 A1* | 10/2020 | Farhi | B60H 1/3205 |

FOREIGN PATENT DOCUMENTS

WO  WO-2019102451 A1 *  5/2019  ......... B60H 1/00428

* cited by examiner

*Primary Examiner* — Jared Fureman
*Assistant Examiner* — Joel Barnett
(74) *Attorney, Agent, or Firm* — McAndrews, Held & Malloy, Ltd.

(57) ABSTRACT

Systems are disclosed for providing a work vehicle with a second air conditioning compressor driven by a small engine mounted on the work vehicle. The second compressor shares a refrigeration loop with the primary air conditioning compressor of the work vehicle. The small engine may be configured to drive various loads, and accordingly may include control circuitry to manage the power provided to the various loads, including the second compressor.

20 Claims, 4 Drawing Sheets

AUXILIARY POWER UNIT AIR CONDITIONING FOR TRUCK CAB COOLING

CROSS REFERENCE TO RELATED APPLICATIONS

The present application claims the benefit of U.S. Provisional Patent Application Ser. No. 62/854,043 filed May 29, 2019, entitled "AUXILIARY POWER UNIT AIR CONDITIONING FOR TRUCK CAB COOLING." The entire contents of U.S. Provisional Patent Application Ser. No. 62/854,043 are expressly incorporated herein by reference.

BACKGROUND

Conventionally, engine-driven power systems (e.g., generators/air compressors/welders) are contained within a metal enclosure that provides environmental protection for the equipment and provides a safety, sound, and aesthetic barrier for the operators. Many different types of enclosures have been used for conventional power systems. Conventional enclosures are configured with components in such a way as to house the engine and/or generator components based on their relative locations.

SUMMARY

An engine driven air conditioning compressor in parallel with an air conditioning compressor of a service truck is disclosed, substantially as illustrated by and described in connection with at least one of the figures.

In certain examples, an auxiliary compressor control system is disclosed. The system includes an auxiliary compressor selectively driven by an auxiliary engine; one or more conduits connected to the auxiliary compressor, the auxiliary compressor to selectively pump fluid through a coolant loop of a cooling system integrated within a vehicle via the one or more conduits, wherein the cooling system is connected to a vehicle compressor driven by a vehicle engine. A controller receives control signals to activate the cooling system; receives control signals to activate the auxiliary compressor; and controls the auxiliary engine or the auxiliary compressor based on the control signals.

In some examples, the controller is operable to transmit or receive information to or from the cooling control system. In examples, a user interface to receive a control input to control the cooling system. In some examples, the cooling system includes a cooling control system operable to receive inputs from one or more sensors, a user interface, or a vehicle control system. In some examples, the cooling system comprises a cooling control system to generate the control signals based on the received inputs In some examples, the controller further includes a memory storage device that includes a list of threshold power characteristic values corresponding to a power allocation scheme for one or more auxiliary devices including the auxiliary compressor, the auxiliary generator, a battery charger, or a welding-type power output. In examples, the controller receives power characteristics corresponding to the one or more auxiliary devices, compares the received power characteristics to the list of threshold power characteristics, and adjusts power output to one or more of the one or more auxiliary devices based on the comparison.

In some examples, the controller increases a speed of the auxiliary engine to drive the auxiliary compressor in response to the control signals. In examples, the controller controls the clutch to activate to drive the auxiliary compressor in response to the control signals. In some examples, the controller receives control signals to deactivate the cooling system, receives data that the vehicle compressor is not being driven by the vehicle engine, and controls the engine to drive the auxiliary compressor based on the control signals.

In examples, the controller receives vehicle engine state information from a vehicle control system. In some examples, the controller transmits or receives information to or from the vehicle control system via a wired or a wireless communications interface.

In disclosed examples, a power system includes an enclosure having an auxiliary engine, an auxiliary compressor selectively driven by the auxiliary engine via a clutch, one or more conduits connected to the auxiliary compressor. The auxiliary compressor selectively pumps fluid through a coolant loop of a cooling system integrated within a vehicle via the one or more conduits, wherein the cooling system is connected to a vehicle compressor driven by a vehicle engine. And a controller to control the auxiliary engine or the auxiliary compressor when the vehicle compressor is not being driven by the vehicle engine.

In some examples, the power system is mounted to the vehicle. In examples, the one or more conduits connect to the coolant loop via one or more valves. In some examples, the one or more valves comprise a connector to secure or remove the one or conduits to the coolant loop. In examples, a belt to operatively link the clutch to a shaft of the auxiliary compressor. In some examples, an energy storage device to provide mechanical power to drive the auxiliary compressor.

In examples, the controller receives control signals to activate the cooling system; receives data that the vehicle compressor is not being driven by the vehicle engine; and controls the auxiliary engine to drive the auxiliary compressor based on the control signals and the data.

In disclosed examples, an auxiliary compressor control system includes an auxiliary compressor selectively driven by an auxiliary engine, one or more conduits connected to the auxiliary compressor, the auxiliary compressor to selectively pump fluid through a coolant loop of a cooling system via the one or more conduits, wherein the cooling system is connected to a primary compressor driven by a primary engine. A controller receives control signals to activate the cooling system, receives control signals to activate the auxiliary compressor, and controls the auxiliary engine to drive the auxiliary compressor based on the control signals.

DETAILED DESCRIPTION

Conventionally, vehicle cabs are cooled by air conditioning (AC) systems integrated into the vehicle dash and chassis and powered by the vehicle engine. If the cab is to be cooled without the vehicle engine running, a separate AC system is put on the vehicle (e.g., a service truck). The separate AC systems may be electrically powered by the vehicle batteries or a separate power source. Separate AC systems may require a refrigeration (or coolant) loop separate from the vehicle's refrigeration loop, and thus separate AC systems may duplicate components and systems.

Accordingly, the present disclosure relates to a second compressor that operates off of a service engine mounted to the back of a service vehicle. The second compressor is tied to the vehicle's AC refrigeration loop, thus eliminating the duplication of the AC refrigeration loop. The service engine may also drive various other loads (e.g., welding loads, air compressors, hydraulic pumps, lights, etc.). In some examples, the service pack includes a controller configured to manage loads on the service engine, including evaluating the output capacity of the service engine, and operating the second compressor when the service engine has available capacity.

Disclosed example auxiliary compressor control systems include: an auxiliary compressor selectively driven by an auxiliary engine; and one or more conduits connected to the auxiliary compressor, the auxiliary compressor to selectively pump fluid through a coolant loop of a cooling system integrated within a vehicle via the one or more conduits, wherein the cooling system is connected to a vehicle compressor driven by a vehicle engine.

Some example auxiliary control systems further include comprising one or more valves configured to selectively channel fluid from one of the auxiliary compressor or the vehicle compressor through the coolant loop.

Some example auxiliary control systems further include a controller configured to: receive control signals to activate the cooling system; and control the auxiliary engine or the auxiliary compressor based on the control signals.

In some example auxiliary control systems, the cooling system includes a cooling control system operable to receive inputs from one or more sensors, a user interface, or a vehicle control system.

In some example auxiliary control systems, the cooling system includes a cooling control system to generate the control signals based on the received inputs.

In some example auxiliary control systems, the controller further includes a memory storage device that includes a list of threshold power characteristic values corresponding to a power allocation scheme for one or more auxiliary devices including the auxiliary compressor, the auxiliary generator, a battery charger, or a welding-type power output In some example auxiliary control systems, the controller is further configured to: receive power characteristics corresponding to the one or more auxiliary devices; compare the received power characteristics to the list of threshold power characteristics; and adjust power output to one or more of the one or more auxiliary devices based on the comparison.

In some example auxiliary control systems, the controller is operable to increase a speed of the auxiliary engine to drive the auxiliary compressor in response to the control signals.

In some example auxiliary control systems, the controller is operable to control the clutch to activate to drive the auxiliary compressor in response to the control signals.

In some example auxiliary control systems, the controller is further configured to: receive control signals to deactivate the cooling system; receive data that the vehicle compressor is not being driven by the vehicle engine; and control the engine to drive the auxiliary compressor based on the control signals.

In some example auxiliary control systems, the controller is further operable to receive vehicle engine state information from a vehicle control system.

In some example auxiliary control systems, the controller is further operable to transmit or receive information to or from the vehicle control system via a wired or a wireless communications interface.

Disclosed example power systems include an enclosure including: an auxiliary engine; an auxiliary compressor selectively driven by the auxiliary engine via a clutch; and one or more conduits connected to the auxiliary compressor, the auxiliary compressor to selectively pump fluid through a coolant loop of a cooling system integrated within a vehicle via the one or more conduits, wherein the cooling system is connected to a vehicle compressor driven by a vehicle engine.

In some example power systems, the one or more conduits connect to the coolant loop via one or more valves.

In some example power systems, the one or more valves comprise a connector to secure or remove the one or conduits to the coolant loop.

Some example power systems further include a belt to operatively link the clutch to a shaft of the auxiliary compressor.

Some example power systems further include an energy storage device to provide mechanical power to drive the auxiliary compressor.

Some example power systems further include a controller to control the auxiliary engine or the auxiliary compressor when the vehicle compressor is not being driven by the vehicle engine.

In some example power systems, the controller is further configured to: receive control signals to activate the cooling system; receive data that the vehicle compressor is not being driven by the vehicle engine; and control the auxiliary engine to drive the auxiliary compressor based on the control signals and the data.

Disclosed example auxiliary compressor control systems include: an auxiliary compressor selectively driven by an auxiliary engine; one or more conduits connected to the auxiliary compressor, the auxiliary compressor to selectively pump fluid through a coolant loop of a cooling system via the one or more conduits, wherein the cooling system is connected to a primary compressor driven by a primary engine; and a controller configured to: receive control signals to activate the cooling system; receive control signals to activate the auxiliary compressor; and control the auxiliary engine to drive the auxiliary compressor based on the control signals.

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As used herein, the terms "first" and "second" may be used to enumerate different components or elements of the same type, and do not necessarily imply any particular order. For example, while in some examples a first compartment is located prior to a second compartment in an airflow path, the terms "first compartment" and "second compartment" do not imply any specific order in which air flows through the compartments.

The term "welding-type system," as used herein, includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "memory" includes volatile and non-volatile memory devices and/or other storage device.

As used herein, the term "torch," "welding torch," "welding tool" or "welding-type tool" refers to a device configured to be manipulated to perform a welding-related task, and can include a hand-held welding torch, robotic welding torch, gun, or other device used to create the welding arc.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW), shielded metal arc welding (SMAW), spray, short circuit, and/or any other type of welding process.

Figure 1:
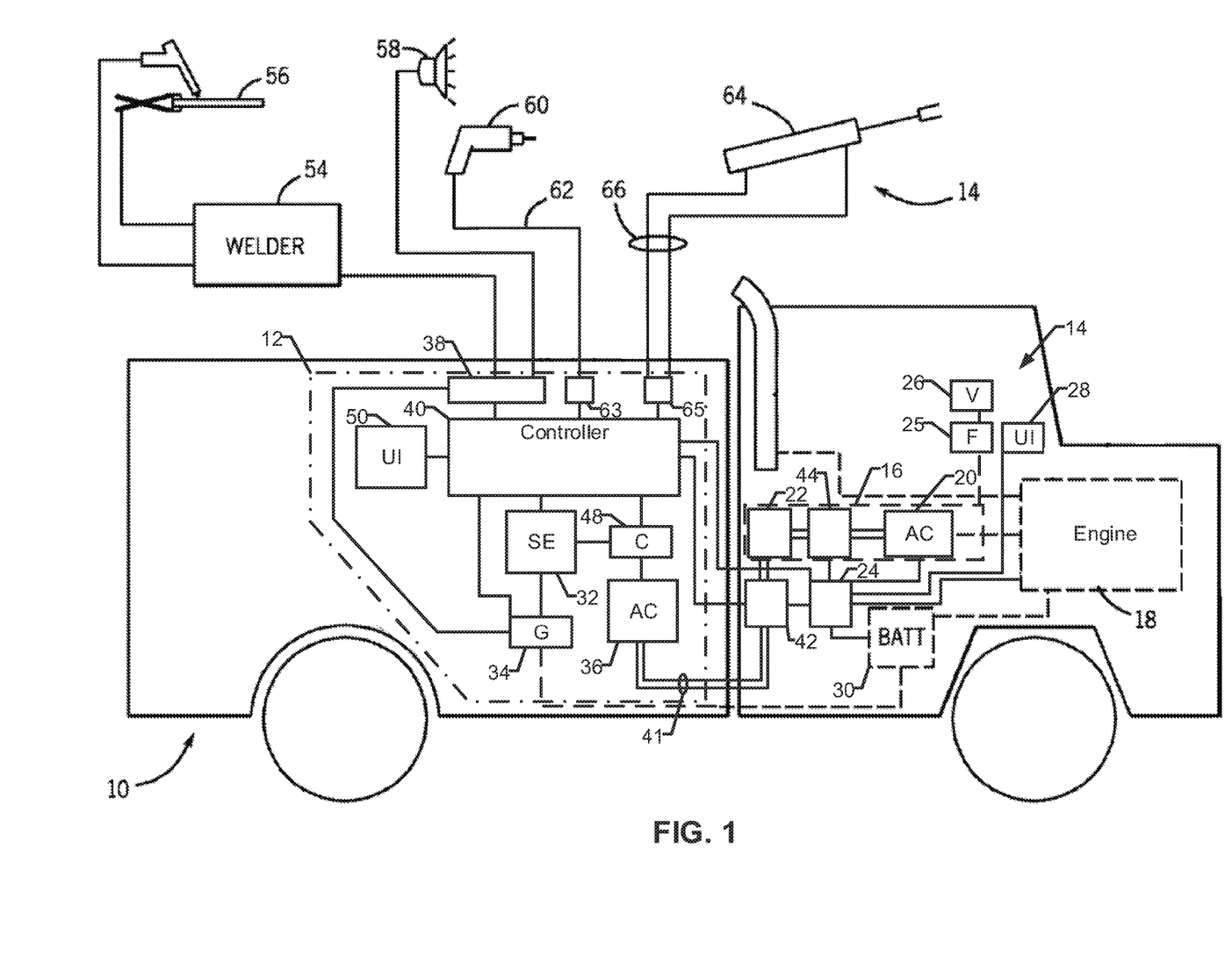
FIG. 1 is a diagrammatic overview of a work vehicle and an installed service pack, in accordance with aspects of this disclosure.

FIG. 1 is a diagrammatical overview of a work vehicle 10 in which a service pack 12 is installed. The work vehicle 10 is shown as a work truck, although any suitable configuration of vehicle may be employed. The work vehicle 10 has a cab 14, which is cooled by an AC system 16 of the work vehicle 10. The work vehicle 10 has an engine 18 which powers the work vehicle, and also powers the AC system of the work vehicle 10. The AC system 16 of the work vehicle 10 includes a primary AC compressor 20 and a refrigeration (or coolant) loop 22, which includes conduits, a condenser, and an evaporator. Control circuitry 24 of the work vehicle 10 controls the operation of the AC system 16 of the work vehicle 10, including the engine 18 and the primary AC compressor 20. Cooled air from the AC system 16 is delivered to the cab 14 of the work vehicle 10 via a blower fan 25 and vents 26 in the cab 14. Control circuitry 24 includes processing circuitry and memory.

A user interface 28 may allow a user to control the temperature in the cab 14. The user interface 28 may include sensors which sense the temperature inside the cab 14. The user interface 28 communicates with the control circuitry 24 to control the AC system of the work vehicle 10 to cool the cab 14 to the set or desired temperature. The control circuitry 24 also controls various other functions of the work vehicle 10, including monitoring the charge of the battery 30 and charging the battery 30 from the engine 18. In some examples, control circuitry 24 includes a dedicated cooling control system which receives control inputs from the user interface 28 and controls the air conditioning system 16 to cool the cab 14 based on the inputs.

In the example of FIG. 1, a service pack 12 is installed on the truck 10. The service pack 12 includes a service engine 32. The service engine 32 may drive a generator 34 and a second AC compressor (auxiliary compressor) 36. The service engine 32 is a source of mechanical power, with the generator 34 and second AC compressor 36 utilizing that power to provide outputs, in the form of electrical power and compressed refrigerant, respectively, in some examples. The mechanical power of the engine 32 is transferred to the generator 34 and compressor 36 via a belt or other interface.

The generator 34 may provide power to various loads, which connect to the service pack 12 at receptacles/outputs 38, 63, and 65 of the service pack 12. For example, a portable welder 54 (e.g., weld circuitry configured to convert power from the generator 34 to welding-type power) that provides current-controlled and/or voltage-controlled power suitable for a welding application receives power from the service pack 12. The welder 54 may receive power from the electrical output of the generator 34 via receptacle(s) 38 and contains circuitry configured to provide for appropriate regulation of the output power provided to cables suitable for a welding application 56. The welder 54 may be any type of welding-type device, including a welder, a plasma cutter, and/or an induction heating device, which may operate in accordance with any one of many conventional welding techniques, such as stick welding, tungsten inert gas (TIG) welding, metal inert gas (MIG) welding, and so forth. Although not illustrated in FIG. 1, certain of these welding techniques may call for or conveniently use wire feeders to supply a continuously fed wire electrode, as well as shielding gasses and other shielding supplies. Such wire feeders may be coupled to the service pack 12 and powered by the service pack 12, where desired.

Auxiliary loads may also be coupled to the receptacle(s) 38 and receive power from the service pack 12. Auxiliary loads may include lights 58, or any other loads that would otherwise be powered by operation of the work vehicle engine 18. The receptacle 38 may also be connected to the work vehicle battery 30 to provide battery charging and/or jump-starting the work vehicle 10. The receptacle 38 may be connected to the battery 30 via a path that is internal to the body of the work vehicle 10 and/or via an external path (e.g., an extension cable connected to a jump start connector.) In some examples, the battery 30 is connected to the generator 34.

The service engine 32 may also drive an air compressor and/or a pump (not shown). The air compressor may provide compressed air via a hose 62 to a tool, such as an impact wrench 60. The hose may connect to an output 63 of the service pack 12. Similarly, a hydraulic load, illustrated in the form of a reciprocating hydraulic cylinder 64, may be coupled to the service pack 12 via appropriate hoses or conduits 66. The hoses or conduits 66 may connect to the service pack 12 at output 65. Certain of these applications, for example, the hydraulic applications, may call for the use of additional valves, particularly for directional control and load holding. Such valves may be incorporated into the work vehicle and/or may be provided separately either in the application itself or intermediately between the service pack and the hydraulic actuators. One or more of the applications illustrated diagrammatically in FIG. 1 may be incorporated into the work vehicle itself. For example, the work vehicle may be designed to include a man lift, scissor lift, hydraulic tailgate, or any other driven systems which can be coupled to the service pack and driven separately from the main vehicle engine.

The service pack 12 may be physically positioned at any suitable location in the work vehicle 10. In a presently contemplated example, the service engine 32 may be mounted on, beneath or beside the vehicle bed or work platform rear of the vehicle cab. In some work vehicles, for example, the vehicle chassis may provide convenient mechanical support for the engine and certain of the other components of the service pack. For example, steel tubing, rails or other support structures extending between the front and rear axles of the vehicle may serve as a support for the service engine 32.

In disclosed examples, the service engine 32 is also configured to selectively drive a second AC compressor 36. For example, the second AC compressor 36 can be connected to refrigeration loop 22 fed from the primary AC compressor 20 of the work vehicle 10. Accordingly, the service engine 32 may drive the AC system 16 via the second AC compressor 36 of the work vehicle 10 with minimal duplication of the AC system components. The second AC compressor 36 is connected to the refrigeration loop 22 via conduits 41, such as through a coupling and/or valve system 42. Similarly, the primary AC compressor 20 is connected to the refrigeration loop 22 via a coupling and/or valve system 44.

In disclosed examples, the control circuitry 24 of the work vehicle communicates with the controller 40 of the service pack 12. The controller 40 includes processing circuitry and memory. The controller 24 may communicate to the controller 40 that the engine 18 of the work vehicle 18 is off. The controller 24 may also route AC settings from the user interface 28 to the controller 40. Accordingly, the controller 40 may control the second AC compressor to operate to cool the cab 14 to a setting set at the user interface 28.

In some examples, one or more of valves 42 and 44 are check valves which only allow the flow of fluid in one direction. Therefore, the valves 42 and 44 only allow fluid to flow from the respective compressor to the refrigeration loop if the pressure in the refrigeration loop is less than the pressure in the respective compressor (20 or 36). If both compressors (20 and 36) are operating, the compressor providing more power will drive the refrigeration loop 22.

In some examples, one or more of valves 42 and 44 are controllable. When the engine 18 of the work vehicle 10 is running, for example, controller 24 closes the valve 42 and opens the valve 44, such that the engine 18 drives the primary AC compressor 20, and refrigerant flows through the refrigeration loop 22 and the primary AC compressor 20 and thereby cools the cab 14. When the engine 18 of the work vehicle 10 is off, then the controller 24 closes the valve 44 and opens the valve 42. Accordingly, the service engine 32 may drive the second AC compressor 36, and refrigerant flows through the second AC compressor 36 and the refrigeration loop 22 and thereby cools the cab 14. In some examples, valves 42 and 44 are controlled by the controller 40 of the service pack 12.

The second AC compressor 36 may be smaller than the primary AC compressor 20, because cooling loads in the cab 14 are generally less when the work vehicle 10 is stationary and the engine 18 is not powering the vehicle 10 systems.

As described above, the service engine 32 may drive various loads in addition to the second AC compressor 36. Accordingly, the controller 40 is configured to manage the power provided to the various loads to prevent an overload on the service engine 32. In some examples, the controller 40 controls the compressor clutch 48 to engage (i.e., controls the service engine 32 to provide power to the compressor 36 to pump refrigerant) when the service engine 32 has the available power to do so. In some examples, the clutch 48 engages with the compressor 36 to pump the refrigerant through the air conditioning system 16, and thus provides cool air to the cab 14, in response to a sensor determination that the temperature in the cab 14 is above a desired set point. The sensor may be included in the user interface 28. The controller 40 may only allow the clutch 48 to engage when the engine power is sufficient to power the compressor, i.e., when the power demand from other loads (e.g., the welder 54, the light 58, the air compressor driven impact wrench 60, and/or the hydraulic lift 64) is sufficiently low (e.g., below a capacity power output level of the service engine 32) such that the service engine 32 has enough power to drive the second AC compressor 36. If, however, the power demand from the other loads is too high relative to available output power, then the controller 40 will not allow the clutch 48 to engage.

In some examples, cooling of the cab 14 is a secondary need compared to the other operations of the service pack 12, and therefore the second AC compressor 36 is disconnected (i.e., the clutch 48 is disengaged) under high load and/or multiple loads on the service engine 32. The controller 40 may be configured to receive information regarding the systems drawing power from the service engine 32 and to prioritize loads based on a power management scheme (e.g., welding and/or cutting may be the first priority load, hydraulics air compression may be second priority, charging the battery may be the third priority, auxiliary output the fourth priority, and cooling the fifth priority).

In some examples, the controller 40 may monitor the service engine 32 speed and engage the clutch 48 when the engine speed is below a threshold. In some examples, the controller 40 may monitor the power load drawn by each load (for example, the controller may determine the power, voltage and/or current drawn by each load) to determine the total load on the service engine 32. If the total load is below a threshold, then the controller 40 allows the clutch 48 to engage and therefore cool the cab 14.

Similarly, the controller 40 may limit the power provided by the service engine 32 to any of the various loads when the overall power demand on the service engine 32 exceeds a threshold. As described above, the controller 40 may assign a priority to the various loads. The priority of the loads may be stored in memory of the controller 40, may be accessed from a remote platform, may be assigned to a unique welding sequence and/or process, may be updated based on historical data (i.e. from machine learning and/or artificial intelligence), and/or other suitable data management sources. In some examples, the priority of loads may be set and/or updated by a user, for example via the user interface 50 of the service pack 12. If the load demand from several of the various loads exceeds a threshold(s), the controller 40 will provide the available power to the loads in order of priority (e.g., first priority may be welding and/or cutting, second priority may be hydraulics, third priority may be the air compressor, the fourth priority may be lighting or other auxiliary loads, the fifth priority may be battery charging, the sixth priority may be driving the second AC compressor 36 to cool the cab 14). Accordingly, when the power demand on the service engine 32 exceeds a threshold, the controller may choke or cut off power to the lower priority loads, for example via opening switches connecting the loads to power or disengaging a clutch, as described above with relation to the second AC compressor 36. If the service engine 32 is operating below its load threshold, the controller 40 may increase the service engine speed to create more power in response to an increase in load power demand.

Loads on the service engine 32 may vary widely throughout the day, and therefore cooling the cab 14 in between other loads on the service engine 32 is an efficient way to achieve cooling without impacting the other loads or using an oversized engine.

A user may also set a desired temperature of the cab 14 (or otherwise control the cooling of the cab 14) at the user interface 50. For example, the user interface 50 can be connected (via wired and/or wireless connection) to the controller 40 of the service pack, which is connected to the control circuitry 24 of the work vehicle 10 and the user interface 28 of the work vehicle. Accordingly, the user may control the cooling of the cab 14 from the user interface of the service pack 12 when the service pack is providing the cooling. For example, the blower fan 25 in the cab may be set too high or too low for the cooling provided by the second AC compressor 36. The controller 40 may control the blower fan speed to the appropriate speed for the cooling provided by the second AC compressor 36. The controller 40 may also control the set temperature, air output locations, and whether to recirculate the air.

In some examples, the controller 40 may connect to the work vehicle's communication system (wireless communication system, CAN bus, etc.) to identify that the work vehicle engine 18 is running. If the work vehicle engine 18 is running, the controller 40 will not command the clutch 48 to engage the second AC compressor 36 and therefore the primary compressor 20 of the work vehicle 10 drives the AC system 16 of work vehicle.

Figure 2:
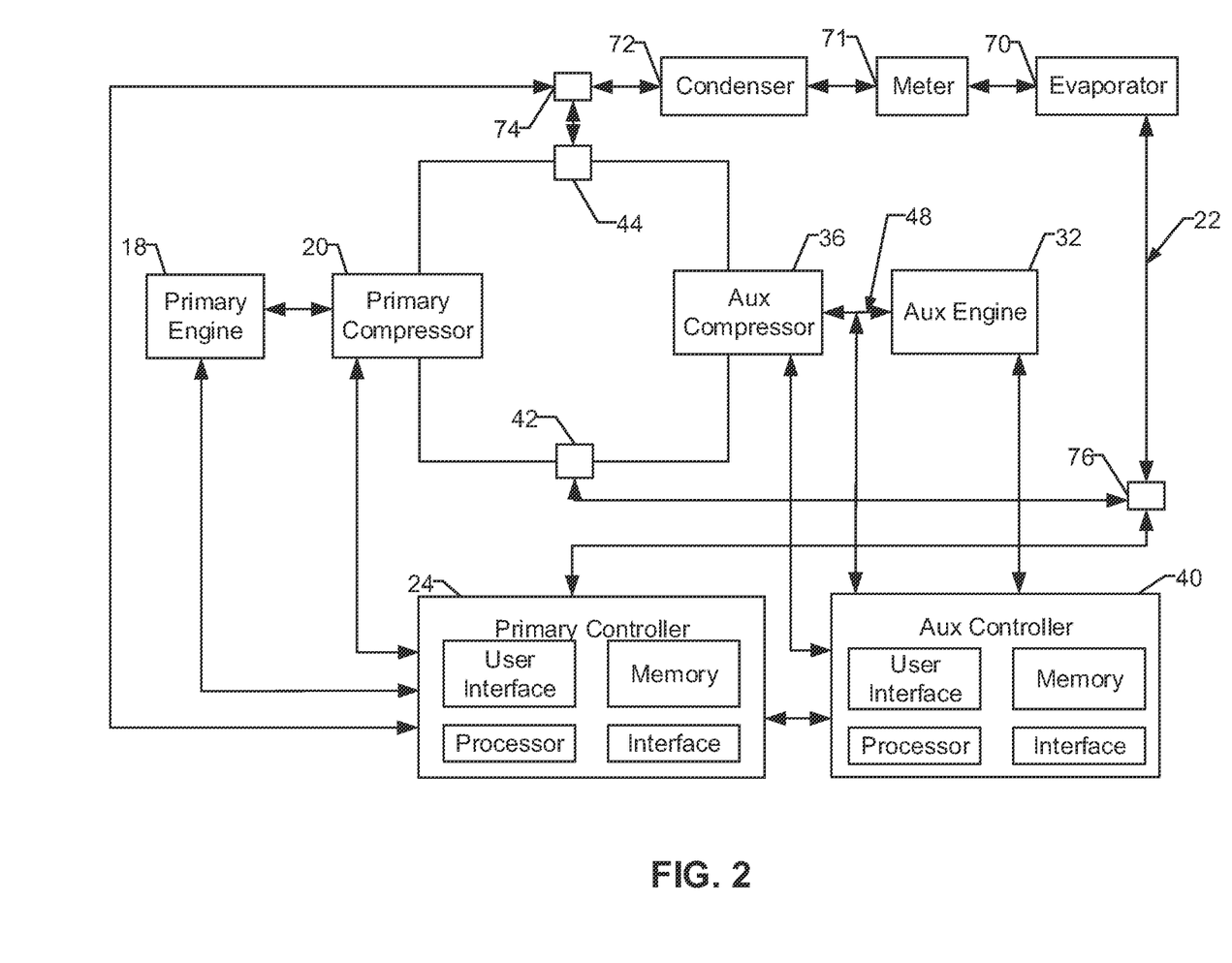
FIG. 2 is a diagrammatic overview of an air conditioning system, in accordance with aspects of this disclosure.

FIG. 2 illustrates a close up view of the components of the AC system 16 of the work vehicle and the AC components of the service pack 12. Where common features are shown, reference numerals from FIG. 1 are used to indicate like features. As shown, the refrigeration loop 22 connects evaporator 70 with condenser 72. The primary compressor 20 and the auxiliary compressor 36 connect to the refrigeration loop 22 via valves 42, 44. The primary controller 24 (or alternatively the auxiliary controller 40) is configured to control valves 42, 44 to open and/or close based on which compressor is in use. Alternatively, valves 42, 44 serve as a connection point for the refrigeration loop 22 and check valves in the primary compressor 20 and the auxiliary compressor 36 to govern compressor operation.

Additionally or alternatively, one or more high and low pressure switches 74, 76 are also included. The switches 74, 76 monitor the pressure within the refrigerant loop 22, and can provide information to the controller 24 and/or controller 40. In this manner, the signals from the switches can be compared against one or more threshold pressure values, which can be used to trigger operation of compressors 20, 36. The threshold pressure values can be stored in memory and compared via a processor in either controller, according to various examples. In some examples, during operation of the AC system, when the measured pressure drops below a first threshold pressure value, the controller(s) activate the compressor(s). This can be done by controlling a clutch (e.g. clutch 48) to turn the compressor(s) from power supplied by the engine(s). In an example where the measured pressure exceeds a second threshold pressure value, the controller(s) can control the compressors to deactivate, such as by disengaging the clutch.

Although the auxiliary compressor is described with respect to a service pack associated with a work vehicle, in some examples the AC system is configured to provide cooling to a variety of environments. For example, the primary engine and primary compressor can be part of a system to provide power, air, etc., such as a portable system for emergency response, cooling of temporary structures, or other such purposes.

Figure 3:
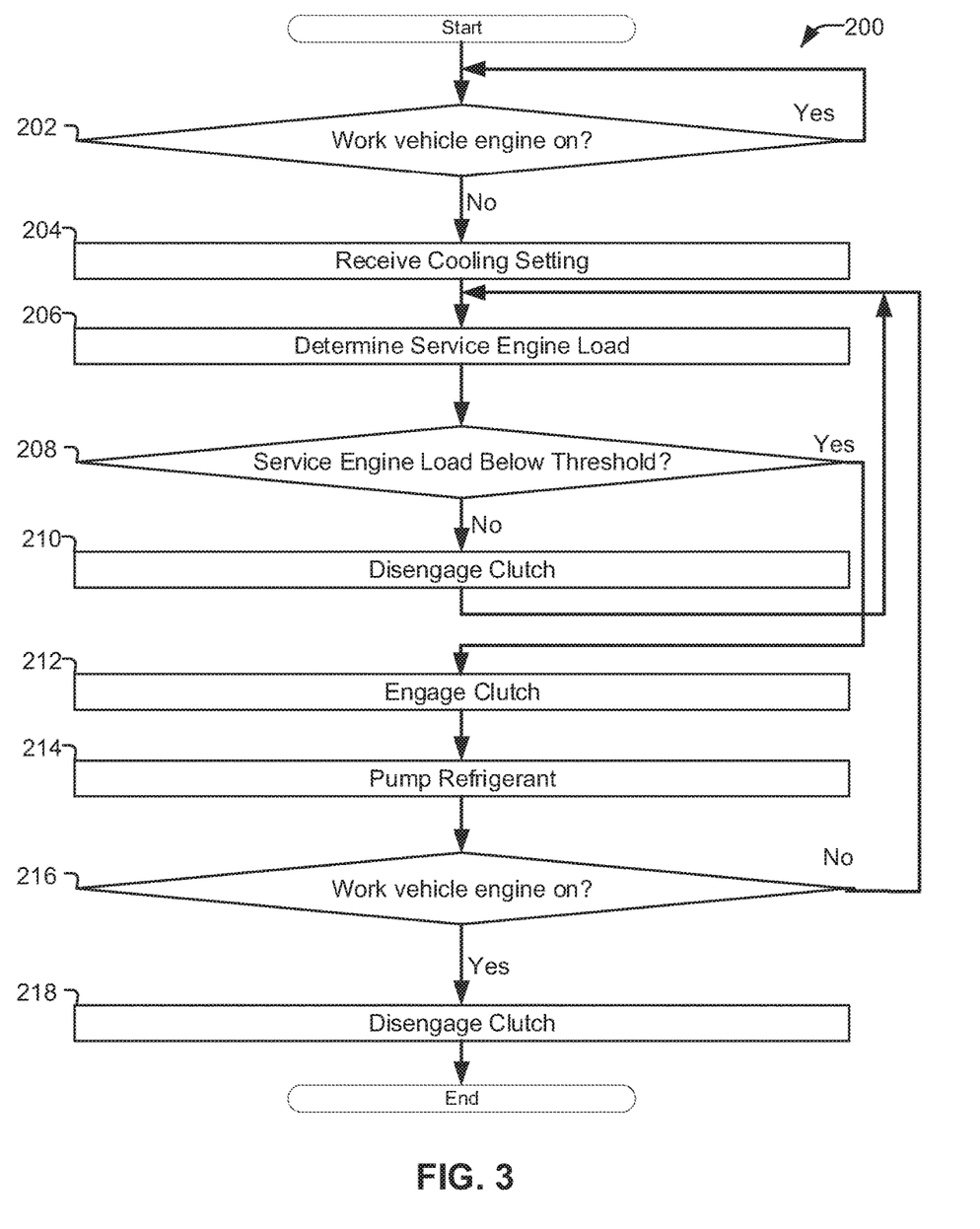
FIG. 3 is a flow chart representative of an example method of cooling a cab of a work vehicle via a service engine and a second air conditioning compressor which shares a refrigeration loop with a primary air conditioning compressor of the work vehicle, in accordance with aspects of this disclosure.

FIG. 3 is an example method 200 of monitoring loads on a service engine and cooling the cab of a work vehicle. The example method 200, may be implemented, for example, in the work vehicle 10 and/or service pack 12 of FIG. 1.

At block 202, controller 40 of the service pack 12 determines whether the engine 18 of the work vehicle is off. In some examples, the controller 40 may receive a signal from the communication system (e.g., wireless system or CAN bus) of the work vehicle 10 indicating that the engine 18 is off. In some examples, the controller 40 may have a wired connection to control circuitry 24 of the work vehicle 10. If the engine 18 is on (block 202), then the controller 40 continues to monitor whether the engine 18 is off.

If the engine 18 is off (202), then at block 204 the controller 40 receives a signal from a user interface indicating a desired cooling setting of the cab 14. In some examples, the cooling setting may be a set temperature. In some examples, the cooling setting may be an analog low-medium-high setting. In some examples, if the work vehicle engine is off (block 202), the controller 40 may also open valve 42 and close valve 44 such that the second AC compressor may pump refrigerant through the refrigeration loop 22. In some examples, as explained above the valves 42 and 44 are check valves which only allow the flow of fluid in one direction. In such examples, the valves 42 and 44 are not controlled by the controller.

At block 206, the controller 40 determines the load on the service engine 32. As described above with reference to FIG. 1, the service engine 32 may drive various loads, including a welder 54, an air compressor (and associated tools 60), hydraulics 64, auxiliary loads 58, battery 30 charging, etc. In some examples, the controller 40 may determine the total load on the service engine 32 by determining the power demand from each load (for example, by measuring the voltage and/or current drawn at each load output) and adding the various power demands. In some examples, the controller 40 may estimate the service engine 32 load by measuring the speed of the service engine 32.

At block 208, the controller 40 compares the service engine load determined at block 206 to one or more thresholds. If the determined load is above a particular threshold (block 208), then at block 210 the controller 40 controls the clutch 48 to disengage and then returns to block 206 and continues to monitor the service engine load. If the determined load is below a threshold (block 208) then at block 212 the controller 40 causes the clutch 48 to engage. Engaging the clutch at block 212 causes the service engine 32 to drive the second AC compressor 36 at block 214, which causes the second AC compressor 36 to pump refrigerant through the refrigeration loop 22 of the work vehicle 10, thereby cooling the cab 14.

At block 216, the controller 40 again checks if the work vehicle engine 18 is on. If the work vehicle engine is not on, then the controller 40 returns to block 206 to determine the service engine load. If the work vehicle engine 18 is on (block 214), then at block 218 the controller 40 controls the clutch to disengage and the method ends. When work vehicle engine 18 is on, the work vehicle engine 18 drives the primary AC compressor 20 to cool the cab. Accordingly, when the work vehicle engine 18 is on, the controller 40 may also control the valve 42 to close and valve 44 to open so that the primary compressor 20 may pump refrigerant through the refrigeration loop 22.

Figure 4:
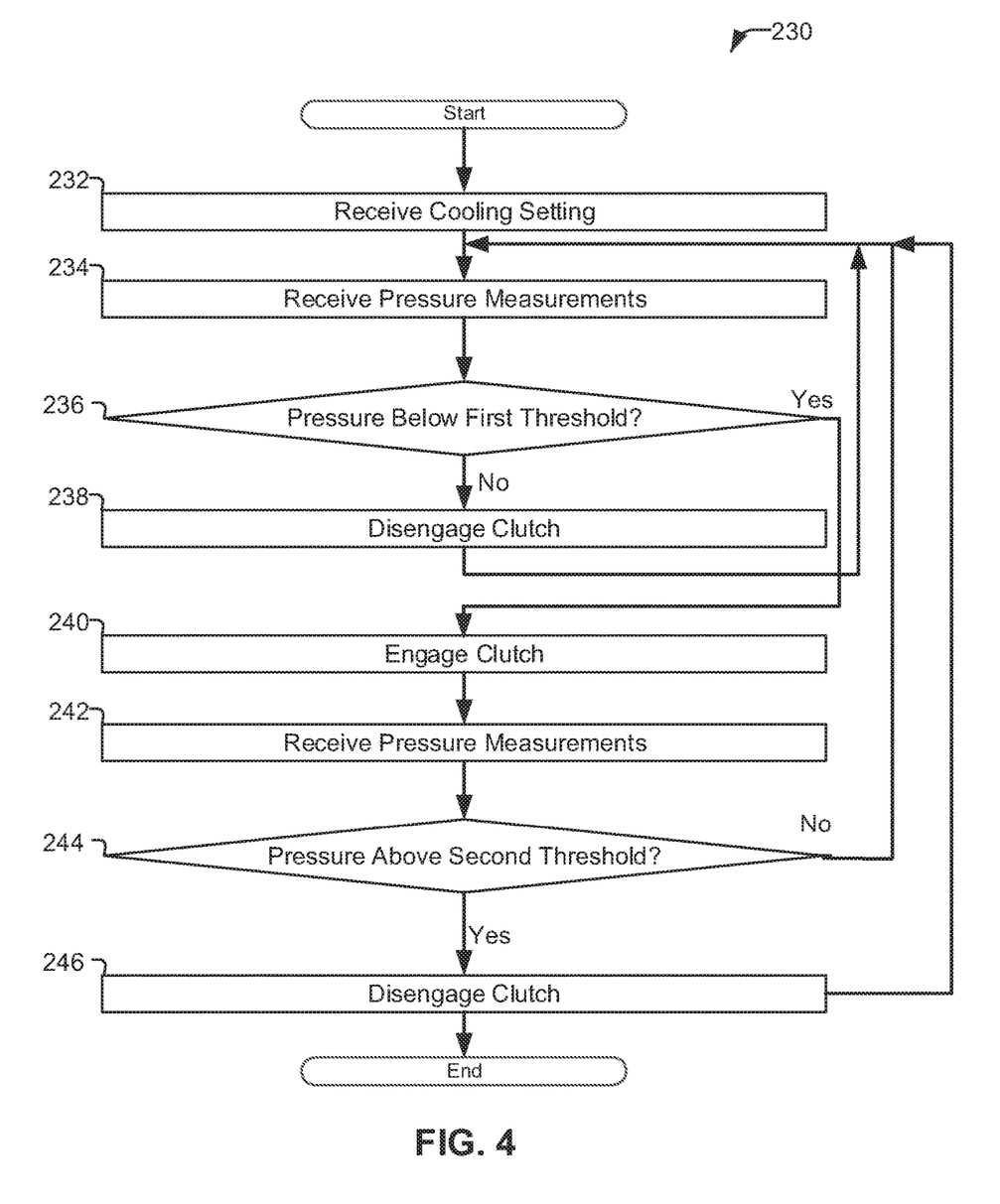
FIG. 4 is a flow chart representative of another example method of controlling cooling of a cab in a work vehicle, in accordance with aspects of this disclosure.

FIG. 4 is another example method 230, which can be additionally or alternatively executed during a cooling operation. The example method 230 may be implemented, for example, in the work vehicle 10 and/or service pack 12 of FIG. 1.

At block 232 the controller 40 receives a signal from a user interface indicating a desired cooling setting of the cab 14. At block 234, the controller 40 receives a measurement from one or more pressure sensors 72, 74. As described above with reference to FIG. 2, the controller(s) compare the measured pressure values to one or more threshold pressure values, such as a first predetermined minimum pressure value and/or a second predetermined maximum pressure value. The threshold pressure values may be stored in memory.

At block 236, the controller 40 determines whether the measured pressure is above or below the first threshold. If the measured pressure is above the first threshold value, then the process controller 40 controls the clutch 48 to disengage in block 238 and then returns to block 234 and continues to monitor the pressure. If the determined load is below a threshold the process proceeds to block 240, such that the controller(s) cause a clutch (e.g., clutch 48) to engage an AC compressor, which causes the activated AC compressor to pump refrigerant through the refrigeration loop 22, thereby cooling the cab 14.

In some examples, one or more pressure switches control the pressure in the refrigeration loop 22. For instance, the pressure switches can activate and/or deactivate based on a pressure measurement at the one or more pressure switches and/or at the one or more pressure sensors 72, 74. In some examples, the pressure switches act as a trigger to engage and/or disengage the active compressor (e.g., the primary AC compressor 20 or the second AC compressor 36) in the refrigeration loop 22. In some examples, the controller 40 controls the pressure switches to activate and/or deactivate in response to a trigger (e.g., a command to deactivate the AC system, a threshold value has been reached, etc.).

At block 242, the controller 40 continues to receive pressure measurements. At block 244, the controller 40 determines whether the measured pressure is above or below the second threshold. If the determined load is below the second threshold, the process returns to block 234 and continues to monitor the pressure during the cooling operation.

If the determined measured pressure is above the second threshold value, then the process controller controls the clutch to disengage in block 246 and then returns to block 234 and continues to monitor the pressure.

Accordingly, the systems and methods disclosed herein allow for a secondary compressor to supplement the air conditioning system of an associated work truck cab, without relying on the battery and/or engine of the work truck itself. Advantageously, the secondary compressor is powered by a system integrated with the work truck (i.e. a service pack or other auxiliary power supply). Further, a size of the secondary compressor may be selected for the limited purpose of auxiliary air conditioning, allowing for smaller, lower power demand, and/or less noisy compressors to supply conditioned air, particularly when the engine of the work truck is not in use. Another advantage is that the secondary compressor can be linked into the tubing of the work truck air conditioning system without the need to duplicate components.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. An auxiliary compressor control system comprising:
 an auxiliary compressor selectively driven by an auxiliary engine, wherein the auxiliary engine is configured to provide power to one or more additional loads;
 one or more conduits connected to the auxiliary compressor, the auxiliary compressor to selectively pump fluid through a coolant loop of a cooling system integrated within a vehicle via the one or more conduits, wherein the cooling system is connected to a vehicle compressor driven by a vehicle engine;
 one or more pressure sensors to measure a pressure at the one or more conduits or the coolant loop; and
 a controller to engage a clutch to activate the auxiliary compressor to selectively pump fluid through the coolant loop in response to the pressure measurement falling below a threshold pressure level and the vehicle engine being off.

2. The auxiliary compressor control system as defined in claim 1, further comprising one or more valves configured to selectively channel fluid from one of the auxiliary compressor or the vehicle compressor through the coolant loop.

3. The auxiliary compressor control system as defined in claim 1, wherein the controller is further configured to:
receive control signals to activate the cooling system; and
control the auxiliary engine or the auxiliary compressor based on the control signals.

4. The auxiliary compressor control system as defined in claim 3, wherein the cooling system comprises a vehicle cooling control system operable to receive inputs from one or more sensors, a user interface, or a vehicle control system.

5. The auxiliary compressor control system as defined in claim 4, wherein the vehicle cooling control system generates the control signals based on the received inputs.

6. The auxiliary compressor control system as defined in claim 3, wherein the controller further comprises a memory storage device that includes a list of threshold power characteristic values corresponding to a power allocation scheme for one or more auxiliary devices including the auxiliary compressor, an auxiliary generator, a battery charger, or a welding-type power output.

7. The auxiliary compressor control system as defined in claim 6, wherein the controller is further configured to:
receive power characteristics corresponding to the one or more auxiliary devices;
compare the received power characteristics to the list of threshold power characteristics; and
adjust power output to one or more of the one or more auxiliary devices based on the comparison.

8. The auxiliary compressor control system as defined in claim 3, wherein the controller is operable to increase a speed of the auxiliary engine to drive the auxiliary compressor in response to the control signals.

9. The auxiliary compressor control system as defined in claim 3, wherein the controller is further operable to control the [1a1] clutch to activate to drive the auxiliary compressor in response to the control signals.

10. The auxiliary compressor control system as defined in claim 3, wherein the controller is further configured to:
receive control signals to deactivate the cooling system;
receive data that the vehicle compressor is not being driven by the vehicle engine; and
control the engine to drive the auxiliary compressor based on the control signals.

11. The auxiliary compressor control system as defined in claim 1, wherein the controller is further operable to receive vehicle engine state information from a vehicle control system.

12. The auxiliary compressor control system as defined in claim 3, wherein the one or more additional loads includes one or more of welding loads, air compressors, hydraulic pumps, or lights.

13. A power system comprising:
an enclosure mounted to a back of a service vehicle comprising:
an auxiliary engine;
an auxiliary compressor selectively driven by the auxiliary engine via a clutch;
one or more conduits connected to the auxiliary compressor, the auxiliary compressor to selectively pump fluid through a coolant loop of a cooling system integrated within a vehicle via the one or more conduits, wherein the cooling system is connected to a vehicle compressor driven by a vehicle engine within a vehicle engine compartment of the service vehicle;
one or more pressure sensors to measure a pressure at the one or more conduits or the coolant loop; and
a controller to engage a clutch to activate the auxiliary compressor to selectively pump fluid through the coolant loop in response to the pressure measurement falling below a threshold pressure level and the vehicle engine being off.

14. The power system as defined in claim 13, wherein the one or more conduits connect to the coolant loop via one or more valves.

15. The power system as defined in claim 14, wherein the one or more valves comprise a connector to secure or remove the one or conduits to the coolant loop.

16. The power system as defined in claim 13, further comprising a belt to operatively link the clutch to a shaft of the auxiliary compressor.

17. The power system as defined in claim 13, further comprising an energy storage device to provide mechanical power to drive the auxiliary compressor.

18. The power system as defined in claim 13, wherein the controller to control the auxiliary engine or the auxiliary compressor when the vehicle compressor is not being driven by the vehicle engine.

19. The power system as defined in claim 13, wherein the controller is further configured to:
receive control signals to activate the cooling system;
receive data that the vehicle compressor is not being driven by the vehicle engine; and
control the auxiliary engine to drive the auxiliary compressor based on the control signals and the data.

20. An auxiliary compressor control system comprising:
an auxiliary compressor selectively driven by an auxiliary engine;
one or more conduits connected to the auxiliary compressor, the auxiliary compressor to selectively pump fluid through a coolant loop of a cooling system via the one or more conduits, wherein the cooling system is connected to a primary compressor driven by a primary engine, the primary compressor controlled by a primary controller to selectively pump the fluid through the coolant loop via the one or more conduits;
one or more pressure sensors to measure a pressure at the one or more conduits or the coolant loop; and
an auxiliary controller to:
receive control signals to activate the cooling system;
receive control signals to activate the auxiliary compressor in response to the pressure measurement falling below a threshold pressure level and the vehicle engine being off; and
control the auxiliary engine to drive the auxiliary compressor to pump fluid through the coolant loop based on the control signals.

* * * * *